United States Patent
Si et al.

(10) Patent No.: US 11,956,118 B2
(45) Date of Patent: Apr. 9, 2024

(54) FAULT ROOT CAUSE IDENTIFICATION METHOD, APPARATUS, AND DEVICE

(71) Applicant: HUAWEI TECHNOLOGIES CO., LTD., Shenzhen (CN)

(72) Inventors: Xiaoyun Si, Nanjing (CN); Dewei Bao, Nanjing (CN); Liang Zhang, Nanjing (CN); Zhenhang Sun, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 416 days.

(21) Appl. No.: 17/342,659

(22) Filed: Jun. 9, 2021

(65) Prior Publication Data
US 2021/0297305 A1 Sep. 23, 2021

Related U.S. Application Data

(63) Continuation of application No. PCT/CN2019/123841, filed on Dec. 7, 2019.

(30) Foreign Application Priority Data

Dec. 11, 2018 (CN) .......................... 201811512160.9

(51) Int. Cl.
*H04L 41/0654* (2022.01)
*H04L 41/0631* (2022.01)
*H04L 41/16* (2022.01)

(52) U.S. Cl.
CPC ........ *H04L 41/065* (2013.01); *H04L 41/0654* (2013.01); *H04L 41/16* (2013.01)

(58) Field of Classification Search
CPC ... H04L 41/0631; H04L 41/065; H04L 41/12; H04L 41/40; H04L 43/026; H04L 43/045; H04L 43/20; H04L 41/0654; H04L 41/16; H04L 43/04
USPC .......................... 370/252, 328, 331; 702/188
See application file for complete search history.

(56) References Cited

U.S. PATENT DOCUMENTS

| | | | |
|---|---|---|---|
| 10,637,715 B1 * | 4/2020 | Vasilyev | ............... H04L 41/065 |
| 2015/0085642 A1 | 3/2015 | Sonoda et al. | |
| 2017/0102984 A1 | 4/2017 | Jiang et al. | |
| 2017/0310542 A1 | 10/2017 | Nair et al. | |

(Continued)

FOREIGN PATENT DOCUMENTS

| | | |
|---|---|---|
| CN | 103914735 A | 7/2014 |
| CN | 104063609 A | 9/2014 |
| CN | 106201757 A | 12/2016 |

(Continued)

*Primary Examiner* — Harun Chowdhury
(74) *Attorney, Agent, or Firm* — Maier & Maier, PLLC

(57) ABSTRACT

A fault root cause identification method, apparatus, and device. For a failure flow that occurs when a connectivity fault for access in a network occurs, a target success flow that has a high similarity with the failure flow is determined from a plurality of success flows in the network based on the failure flow. Then, a target fault root cause of the failure flow is obtained based on the failure flow, the target success flow, and a trained first machine learning model. In this way, the target success flow related to the failure flow is determined from the plurality of success flows in the network, and the first machine learning model trained by using a large quantity of success flows and failure flows whose feature indicators are slightly different from each other is used.

18 Claims, 7 Drawing Sheets

201

Determine, from a plurality of first success flows based on a first failure flow in a first network, a first target success flow related to the first failure flow, where there is a high similarity between the first target success flow and the first failure flow

202

Determine a target fault root cause of the first failure flow based on feature indicators of the first failure flow, feature indicators of the first target success flow, and a trained first machine learning model

(56) References Cited

U.S. PATENT DOCUMENTS

2021/0336841 A1* 10/2021 Ranatunga ............ H04L 43/026

FOREIGN PATENT DOCUMENTS

| CN | 106209404 A | 12/2016 |
|---|---|---|
| CN | 106453392 A | 2/2017 |
| CN | 106959662 A | 7/2017 |
| CN | 107579956 A | 1/2018 |
| CN | 108509975 A | 9/2018 |
| WO | 2017025773 A1 | 2/2017 |
| WO | 2017072614 A1 | 5/2017 |
| WO | 2018059687 A1 | 4/2018 |

* cited by examiner

FAULT ROOT CAUSE IDENTIFICATION METHOD, APPARATUS, AND DEVICE

CROSS-REFERENCE TO RELATED APPLICATIONS

This application is a continuation of International Application No. PCT/CN2019/123841, filed on Dec. 7, 2019, which claims priority to Chinese Patent Application No. 201811512160.9, filed on Dec. 11, 2018. The disclosures of the aforementioned applications are hereby incorporated by reference in their entireties.

TECHNICAL FIELD

The embodiments relate to the field of communication technologies, and in particular, to a fault root cause identification method, apparatus, and device.

BACKGROUND

Currently, a network, for example, a data center network (DCN), is widely used to transfer, display, calculate, and store data information, and accelerate transmission of the data information on an internet network infrastructure.

The network includes servers and forwarding nodes. Access to various protocols may be performed between servers through forwarding nodes, for example, access to a transmission control protocol (TCP), access to an internet protocol (IP), access to a user datagram protocol (UDP), and the like. For example, in TCP access, a specific process includes: A source server sends a TCP connection request to a destination server through forwarding nodes, and the destination server sends a TCP reply message to the source server through the forwarding nodes, to establish a TCP access connection.

However, because of IP offline, application offline, application overload, or the like, the access connection in the network may fail. This may be considered that a connectivity fault occurs in the network. An accurate cause of the connectivity fault for the access, namely, a fault root cause, needs to be found in time to efficiently and pertinently rectify the fault, so as to ensure service continuity and proper running of the network.

SUMMARY

To resolve the foregoing problem, embodiments provide a fault root cause identification method, apparatus, and device, to accurately identify a fault root cause of a connectivity fault for access in a network, thereby reducing network maintenance costs and improving user experience in using the network.

According to a first aspect, a fault root cause identification method is provided. For a specific first network, if a first failure flow corresponding to a connectivity fault for access occurs, first, a first target success flow that has a high similarity with the first failure flow is determined from a plurality of first success flows in the first network based on the first failure flow. Then, the first failure flow and the first target success flow are input into a trained first machine learning model, to output a target fault root cause of the first failure flow.

In this way, the target success flow that has the similarity with the failure flow is determined from the plurality of success flows in the network, that is, the target success flow whose feature indicators are slightly different from feature indicators of the failure flow is determined. In combination with the first machine learning model repeatedly trained by using a large quantity of success flows and failure flows whose feature indicators are slightly different from each other, a difference between the feature indicators of the to-be-analyzed failure flow and the feature indicators of the target success flow related to the to-be-analyzed failure flow can be accurately learned, so that the target fault root cause of the failure flow can be accurately output based on the feature indicators that are slightly different from each other. In this way, the fault root cause of a connectivity fault that causes the failure flow can be accurately identified, thereby reducing network maintenance costs and improving user experience in using the network.

In a first possible implementation of the first aspect, this embodiment may further include a training process of the first machine learning model. The process further includes: first, a plurality of second failure flows in a second network and a first known fault root cause corresponding to each of the second failure flows are determined. Then, a second target success flow related to each of the second failure flows is determined from a plurality of second success flows in the second network, where there is a high similarity between each of the second failure flows and the second target success flow related to the second failure flow. Then, training is performed based on feature indicators of the plurality of second failure flows, the first known fault root cause corresponding to each of the second failure flows, and feature indicators of the second target success flow related to each of the second failure flows, to obtain the first machine learning model. In this way, the first machine learning model obtained through training can accurately learn a slight difference between feature indicators of a to-be-analyzed failure flow and feature indicators of a target success flow related to the to-be-analyzed failure flow, and an output result indicating a target fault root cause of the failure flow is obtained based on the difference. That is, this provides a data basis for the fault root cause identification method provided in this embodiment.

The flows mentioned in this embodiment, for example, the first failure flow, the first target success flow, the plurality of first success flows, the plurality of second failure flows, the second target success flow related to each of the second failure flows, and the plurality of second success flows, are all TCP flows, IP flows, or UDP flows. It may be understood that the first failure flow, the first target success flow, and the plurality of first success flows are flows of a same type. Similarly, the plurality of second failure flows, the second target success flow related to each of the second failure flows, and the plurality of second success flows also need to be flows of a same type.

It may be understood that, that there is a high similarity between the first target success flow and the first failure flow is further: the similarity between the first target success flow and the first failure flow is greater than a preset similarity threshold. Alternatively, the similarity between the first target success flow and the first failure flow belongs to first N maximum similarities between the plurality of first success flows and the first failure flow in the first network, where N is a preset value.

In a second possible implementation of the first aspect, that the first target success flow related to the first failure flow is determined from the plurality of success flows based on the first failure flow in the first network includes: first, obtaining the feature indicators of the first failure flow in the first network and feature indicators of the plurality of first success flows in the first network; second, calculating a similarity between each of the first success flows and the first failure flow based on a target coefficient set, the feature indicators of the first failure flow, and the feature indicators of each of the first success flows, where each target coefficient included in the target coefficient set corresponds to one feature indicator of the first failure flow and one feature indicator of each of the first success flows; and third, marking a first success flow corresponding to a highest similarity among the plurality of similarities obtained through calculation as the first target success flow.

In the second possible implementation of the first aspect, a process of determining the target coefficient set in the second step may be further included. The process further includes: first, obtaining feature indicators of a third failure flow in a third network and feature indicators of a plurality of third success flows in the third network; then, separately calculating, based on a plurality of randomly selected initial coefficient sets, the feature indicators of the third failure flow, and feature indicators of each of the third success flows, a similarity between each of the third success flows and the third failure flow in each of the initial coefficient sets; then, determining, based on the plurality of similarities obtained through calculation, a third target success flow corresponding to the third failure flow in each of the initial coefficient sets; then, determining, based on the feature indicators of the third failure flow, feature indicators of the third target success flow that corresponds to the plurality of initial coefficient sets, and a second machine learning model, a difference between a second learned fault root cause corresponding to the third failure flow and a second known fault root cause corresponding to the third failure flow in each of the initial coefficient sets; and finally, determining the target coefficient set based on the plurality of initial coefficient sets and the difference that corresponds to each of the initial coefficient sets. The initial coefficient sets may be randomly selected by using an e-greedy algorithm.

In an example, the "determining a difference between a second learned fault root cause corresponding to the third failure flow and a second known fault root cause corresponding to the third failure flow in each of the initial coefficient sets" in the foregoing process of determining the target coefficient set may be further implemented in the following manner: calculating the similarity between each of the third success flows and the third failure flow based on each initial coefficient set, and determining, based on the plurality of the similarities obtained through calculation, the third target success flow corresponding to the third failure flow corresponding to each initial coefficient set; inputting the third failure flow and the third target success flow into the second machine learning model, and determining, based on an output result of the second machine learning model, the second learned fault root cause corresponding to the third failure flow; calculating a first difference between the second learned fault root cause and the second known fault root cause that corresponds to the third failure flow; performing parameter adjustment on the second machine learning model based on the first difference, using a second machine learning model obtained through the parameter adjustment as the second machine learning model again, and continuing to perform the step "inputting the third failure flow and the third target success flow into the second machine learning model"; and until a quantity of parameter adjustment times reaches a preset quantity threshold, or a first difference between a current second learned fault root cause and the second known fault root cause is less than a preset difference threshold, determining, based on a plurality of first differences obtained through calculation, the difference corresponding to each initial coefficient set.

It should be noted that only after the target coefficient set is determined from the initial coefficient sets, the first target success flow related to the first failure flow can be accurately determined from the plurality of first success flows, thereby ensuring accuracy of input data of the trained first machine learning model, and improving accuracy of the identified target fault root cause of the first failure flow.

In an example, a specific implementation process of the step "determining the target coefficient set based on the plurality of initial coefficient sets and the difference that corresponds to each of the initial coefficient sets" in the second possible implementation of the first aspect further includes: performing fitting on the plurality of initial coefficient sets and the difference that corresponds to each of the initial coefficient sets; and determining a coefficient set corresponding to a minimum value point in a fitting result as the target coefficient set.

It may be understood that the target fault root cause includes IP offline, application offline, a security device layer exception, a routing device layer exception, a network port error, or application overload.

In a third possible implementation of the first aspect, to quickly rectify the connectivity fault and enable the network to quickly provide high-quality services for users, this embodiment may further include: maintaining the first network based on the target fault root cause.

According to a second aspect, a fault root cause identification apparatus is further provided. The apparatus includes: a first determining unit, configured to determine, from a plurality of first success flows based on a first failure flow in a first network, a first target success flow related to the first failure flow, where there is a high similarity between the first target success flow and the first failure flow; and a second determining unit, configured to determine a target fault root cause of the first failure flow based on feature indicators of the first failure flow, feature indicators of the first target success flow, and a trained first machine learning model.

In a first possible implementation of the second aspect, this embodiment may further include a training process of the first machine learning model. The process is further implemented by a third determining unit, a fourth determining unit, and a training unit. For example, the apparatus further includes: the third determining unit, configured to determine a plurality of second failure flows in a second network and a first known fault root cause corresponding to each of the second failure flows; the fourth determining unit, configured to determine, from a plurality of second success flows in the second network, a second target success flow related to each of the second failure flows, where there is a high similarity between each of the second failure flows and the second target success flow related to the second failure flow; and the training unit, configured to perform training based on feature indicators of the plurality of second failure flows, the first known fault root cause corresponding to each of the second failure flows, and feature indicators of the second target success flow related to each of the second failure flows, to obtain the first machine learning model.

The flows mentioned in the apparatus embodiment, for example, the first failure flow, the first target success flow, the plurality of first success flows, the plurality of second failure flows, the second target success flow related to each of the second failure flows, and the plurality of second success flows, are all TCP flows, IP flows, or UDP flows. It may be understood that the first failure flow, the first target success flow, and the plurality of first success flows are flows of a same type. Similarly, the plurality of second failure flows, the second target success flow related to each of the second failure flows, and the plurality of second success flows also need to be flows of a same type.

It may be understood that, that there is a high similarity between the first target success flow and the first failure flow is further: the similarity between the first target success flow and the first failure flow is greater than a preset similarity threshold. Alternatively, the similarity between the first target success flow and the first failure flow belongs to first N maximum similarities between the plurality of first success flows and the first failure flow in the first network, where N is a preset value.

In a second possible implementation of the second aspect, the first determining unit of the apparatus may further include: an obtaining subunit, configured to obtain the feature indicators of the first failure flow in the first network and feature indicators of the plurality of first success flows in the first network; a calculation subunit, configured to calculate a similarity between each of the first success flows and the first failure flow based on a target coefficient set, the feature indicators of the first failure flow, and the feature indicators of each of the first success flows, where each target coefficient included in the target coefficient set corresponds to one feature indicator of the first failure flow and one feature indicator of each of the first success flows; and a first determining subunit, configured to mark a first success flow corresponding to a highest similarity among the plurality of similarities obtained through calculation as the first target success flow.

A process of determining the target coefficient set may be further included in this implementation, and may be further implemented by an obtaining unit, a calculation unit, a fifth determining unit, a sixth determining unit, and a seventh determining unit in the apparatus. To be specific, the apparatus further includes: the obtaining unit, configured to obtain feature indicators of the third failure flow in a third network and feature indicators of a plurality of third success flows in the third network; the calculation unit, configured to separately calculate, based on a plurality of randomly selected initial coefficient sets, the feature indicators of the third failure flow, and feature indicators of each of the third success flows, a similarity between each of the third success flows and the third failure flow in each of the initial coefficient sets; the fifth determining unit, configured to determine, based on the plurality of similarities obtained through calculation, a third target success flow corresponding to the third failure flow in each of the initial coefficient sets; the sixth determining unit, configured to determine, based on the feature indicators of the third failure flow, feature indicators of the third target success flow that corresponds to the plurality of initial coefficient sets, and a second machine learning model, a difference between a second learned fault root cause corresponding to the third failure flow and a second known fault root cause corresponding to the third failure flow in each of the initial coefficient sets; and the seventh determining unit, configured to determine the target coefficient set based on the plurality of initial coefficient sets and the difference that corresponds to each of the initial coefficient sets. The initial coefficient sets may be randomly selected by using an e-greedy algorithm.

In an example, the foregoing "the sixth determining unit, configured to determine, based on the feature indicators of the third failure flow, feature indicators of the third target success flow that corresponds to the plurality of initial coefficient sets, and a second machine learning model, a difference between a second learned fault root cause corresponding to the third failure flow and a second known fault root cause corresponding to the third failure flow in each of the initial coefficient sets" may be further implemented in the following manner: a third determining subunit is configured to calculate the similarity between each of the third success flows and the third failure flow based on each initial coefficient set, and determine, based on the plurality of similarities obtained through calculation, the third target success flow corresponding to the third failure flow corresponding to each initial coefficient set. A processing subunit is configured to input the third failure flow and the third target success flow into the second machine learning model, determine, based on an output result of the second machine learning model, the second learned fault root cause corresponding to the third failure flow, and calculate a first difference between the second learned fault root cause and the second known fault root cause that corresponds to the third failure flow. An adjustment subunit is configured to perform parameter adjustment on the second machine learning model based on the first difference, use a second machine learning model obtained through the parameter adjustment as the second machine learning model again, and go back to trigger the processing subunit to perform. Until a quantity of parameter adjustment times reaches a preset quantity threshold, or a first difference between a current second learned fault root cause and the second known fault root cause is less than a preset difference threshold, a fourth determining subunit is triggered to be further configured to determine, based on a plurality of first differences obtained through calculation, a difference corresponding to each initial coefficient set.

In an example, the seventh determining unit may further include: a fitting subunit, configured to perform fitting on the plurality of initial coefficient sets and the difference that corresponds to each of the initial coefficient sets; and a second determining subunit, configured to determine a coefficient set corresponding to a minimum value point in a fitting result as the target coefficient set.

It may be understood that the target fault root cause includes IP offline, application offline, a security device layer exception, a routing device layer exception, a network port error, or application overload.

In a third possible implementation of the second aspect, to quickly rectify the connectivity fault and enable the network to quickly provide high-quality services for users, the apparatus provided in this embodiment may further include: a maintenance unit, configured to maintain the first network based on the target fault root cause.

It should be noted that, for implementation effects of the apparatus provided in the second aspect in this embodiment, refer to the descriptions of the method provided in the first aspect. Details are not described herein again.

According to a third aspect, an embodiment provides a fault root cause identification device. The device has a function of implementing the foregoing method. The function may be implemented by hardware, or may be implemented by hardware executing corresponding software. The hardware or the software includes one or more modules corresponding to the foregoing function. In a possible implementation, a structure of the foregoing device includes a processor and a transceiver. The processor is configured to process corresponding functions in the foregoing method performed by the fault root cause identification apparatus. The transceiver is configured to implement communication between the foregoing fault root cause identification apparatus and another device. The fault root cause identification device may further include a memory. The memory is configured to be coupled to the processor, and the memory stores program instructions and data that are necessary for the fault root cause identification device.

According to a fourth aspect, an embodiment provides a computer-readable storage medium. The computer-readable storage medium stores instructions. When the instructions are run on a computer, the computer is enabled to perform the method according to the first aspect.

According to a fifth aspect, an embodiment provides a computer program product including instructions. When the computer program product is run on a computer, the computer is enabled to perform the method according to the first aspect.

According to a sixth aspect, this application provides a chip system. The chip system includes a processor, configured to support the foregoing apparatus or user equipment in implementing a function in the foregoing aspects, for example, generating or processing information in the foregoing method. In a possible implementation, the chip system further includes a memory, and the memory is configured to store program instructions and data that are necessary for a data sending device. The chip system may include a chip, or may include a chip and another discrete device.

BRIEF DESCRIPTION OF THE DRAWINGS

To describe solutions in embodiments more clearly, the following briefly describes accompanying drawings for describing the embodiments. Additionally, the accompanying drawings in the following descriptions show merely some embodiments, and a person of ordinary skill in the art may derive other drawings from these accompanying drawings.

DETAILED DESCRIPTION OF THE EMBODIMENTS

Figure 1:
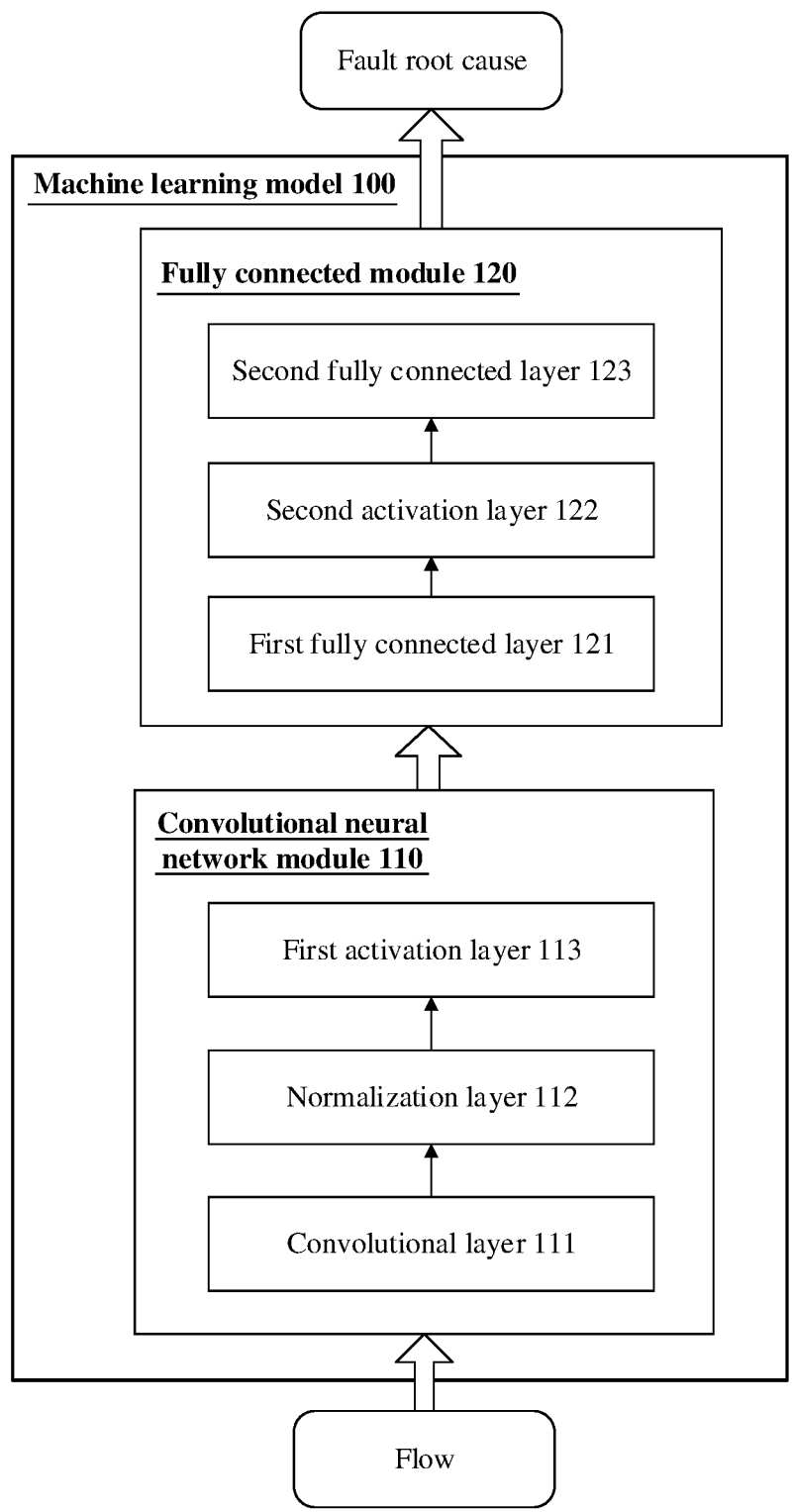
FIG. 1 is a schematic structural diagram of a machine learning model according to an embodiment.

To meet ever-increasing data processing requirements, redundant devices are used in a plurality of networks, and a plurality of switching devices are disposed as forwarding nodes at each layer of the networks. However, servers are abstracted from physical resources to logical resources, and are virtualized into a plurality of virtual machines (VM), thereby improving resource usage.

As a network architecture becomes increasingly complex, more applications are provided for users in a network. Access between servers, between VMs, or between servers and VMs is frequent, and related information of each access (including a connection request and a reply message) can be recorded by using various types of flows. When a quantity of the various types of flows is large, various access connection establishment failures occur due to IP offline, application offline, application overload, or the like. This is considered that a connectivity fault occurs in the network. The various types of flows include corresponding failure flows that record related information when the access connection establishment failures occur.

A fault root cause of the connectivity fault for the access needs to be found accurately, so as to ensure service continuity and proper running of the network, and further efficiently and pertinently rectify the fault, and recover the network. A common manner of determining the fault root cause of the failure flow is as follows: a user actively discovers a state of an access connection establishment failure and performs a corresponding complaint operation, and a technical engineer analyzes and searches for a failure flow generated in the network, and determines, through data analysis, a fault cause of the failure flow. Consequently, this manner is time-consuming and low efficient, and the failure cannot be rectified in time for the user. In addition, the user actively reports the exception, and this deteriorates user experience.

To resolve the foregoing problem of manually determining a fault root cause of a failure flow, a machine learning model may be constructed and trained to identify a fault root cause of a connectivity fault of a failure flow. For example, refer to a machine learning model 100 shown in FIG. 1. The machine learning model 100 includes a convolutional neural network module 110 and a fully connected module 120. The convolutional neural network module 110 may include a convolutional layer 111, a normalization layer 112, and a first activation layer 113. The fully connected module 120 may include a first fully connected layer 121, a second activation layer 122, and a second fully connected layer 123. However, for the machine learning model 100 with a single input channel, because flows generated in the network record a large amount of complex information, even though the convolutional neural network module 110 and the fully connected module 120 are properly constructed, and a sufficient quantity of training sample sets are used for training, the machine learning model 100 cannot accurately obtain a real fault root cause of an input failure flow. In addition, the machine learning model 100 is applicable only to fault root cause identification of failure flows generated by a network corresponding to the training samples, and cannot be generalized. Therefore, the machine learning model 100 cannot be generalized online regardless of whether all flows in the network or all failure flows in the network are input, and regardless of how many times of training are performed.

Based on this, to resolve the problems that the foregoing machine learning model 100 cannot be converged, cannot accurately perform identification, and cannot be generalized, in the embodiments, a method for automatically and accurately identifying a fault root cause of a failure flow is provided. For example, a first target success flow related to a first failure flow is determined for the first failure flow generated in a first network from a plurality of first success flows in the first network, in other words, the first target success flow that has a high similarity with the first failure flow is introduced for the first failure flow. Then, two flows between which there is a high similarity can be compared and learned based on the first failure flow, the first target success flow, and a trained first machine learning model, and it is relatively easy to find a slight difference between the two flows. In this way, a target fault root cause corresponding to the difference, namely, a root cause of the first failure flow that causes a connectivity fault, can be effectively analyzed. Therefore, the fault root cause does not need to be analyzed and determined manually by technical engineers, and problems that the fault root cause determined in a manner, for example, in the manner shown in FIG. 1, is not accurate and the machine learning model cannot be generalized are also resolved, thereby reducing network maintenance costs, and improving user experience in using the network.

With reference to the accompanying drawings, a specific implementation of a fault root cause identification method in the embodiments is described in detail in the following embodiments.

Figure 2:
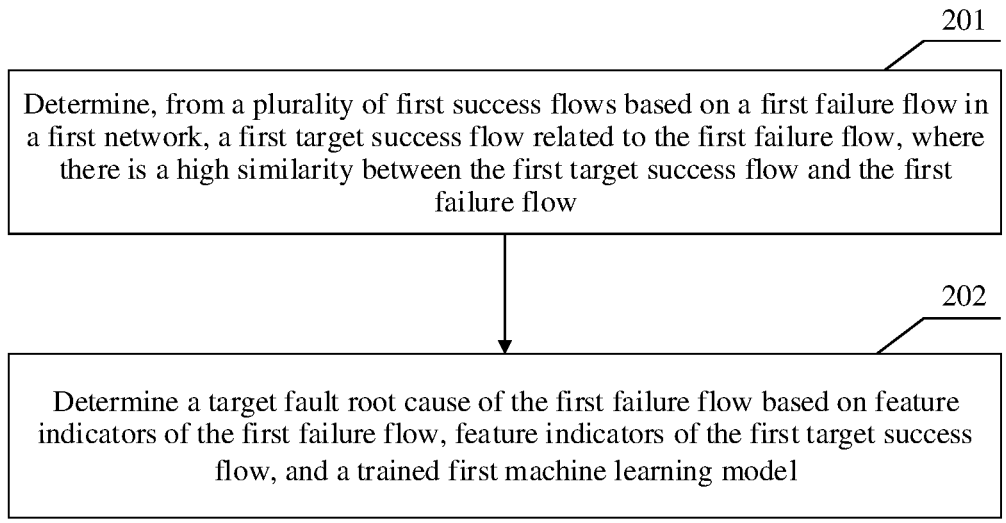
FIG. 2 is a schematic flowchart of a fault root cause identification method according to an embodiment.

FIG. 2 is a schematic flowchart of a fault root cause identification method according to an embodiment. The fault root cause identification method may further include:

Step 201: Determine, from a plurality of first success flows based on a first failure flow in a first network, a first target success flow related to the first failure flow, where there is a high similarity between the first target success flow and the first failure flow.

It may be understood that the flows are used to record related information of various types of access that occurs between servers, between VMs, or between servers and VMs in a network (for example, a DCN). It should be noted that each type of access generates a corresponding type of flows. For example, a flow that records related information of TCP access is recorded as a TCP flow, a flow that records related information of IP access is recorded as an IP flow, and a flow that records related information of UDP access is recorded as a UDP flow.

Related information recorded by a flow is also recorded as feature indicators of the flow. For example, for the TCP flow generated in the TCP access, recorded feature indicators may include: a source IP, a source port, a destination IP, a destination port, request connection time, a request direction state flag, a response direction state flag, an IP address of each forwarding node that a request direction passes through, and an IP address of each forwarding node that a response direction passes through.

Whether a flow is a failure flow can be determined based on feature indicators recorded in the flow. For example, the feature indicators recorded in the TCP flow may be analyzed to determine whether the TCP flow is a failure TCP flow. In one case, if a quantity of same sent requests recorded in the TCP flow is excessively large, but no responses corresponding to the requests are received, the TCP flow is considered as a failure TCP flow. In another case, if a quantity of same sent requests recorded in the TCP flow is excessively large and no data is exchanged between a source node and a destination node after the requests are sent, the TCP flow may also be considered as a failure TCP flow. For another example, the request direction state flag and the response direction state flag in the TCP flow may be read to determine that the TCP is a failure TCP flow. In one case, when the request direction state flag in the feature indicators recorded in the TCP flow indicates a failure, the TCP flow may be considered as a failure TCP flow. In another case, when the response direction state flag in the feature indicators recorded in the TCP flow indicates a failure, the TCP flow may be considered as a failure TCP flow.

It may be understood that, in each network, a large quantity of flows may be generated at any moment. Once a failure flow occurs, it indicates that corresponding access of a user fails to be established. In this case, to enable the network to recover as soon as possible to provide the user with a service, a fault root cause of the failure flow can be identified in time and accurately according to this embodiment, thereby fundamentally rectifying the fault and improving user experience.

During specific implementation, the first network includes the plurality of first success flows. When the first failure flow is generated in the network, a first success flow that is related to the first failure flow and that is selected from the plurality of first success flows may be used as the first target success flow. It should be noted that the first network refers to any network on which the first failure flow occurs due to a connectivity fault, and does not refer to a specific network.

It may be understood that, that the first target success flow is related to the first failure flow means that there is a high similarity between the first target success flow and the first failure flow. Further, there may be the following two possible cases: the similarity between the first target success flow and the first failure flow is greater than a preset similarity threshold. Alternatively, the similarity between the first target success flow and the first failure flow belongs to first N maximum similarities between the plurality of first success flows and the first failure flow in the first network, where N is a preset value.

In an example, that there is a high similarity between the first target success flow and the first failure flow may be that the similarity between the first target success flow and the first failure flow is greater than the preset similarity threshold. The preset similarity threshold is a minimum allowed value of a similarity between feature indicators of the first success flow and feature indicators of the first failure flow. When the similarity between the feature indicators of the first success flow and the feature indicators of the first failure flow is greater than the preset similarity threshold, it indicates that the first success flow and the first failure flow are two flows with a high similarity. In this case, it may be determined that the first success flow is the first target success flow. Otherwise, when the similarity between the feature indicators of the first success flow and the feature indicators of the first failure flow is not greater than the preset similarity threshold, it indicates that the similarity between the first success flow and the first failure flow is not high enough. In this case, it may be determined that the first success flow is not the first target success flow corresponding to the first failure flow.

It can be understood that a similarity between two flows is related to various feature indicators (for example, a source IP, a source port, a destination IP, a destination port, request connection time, a request direction state flag, a response direction state flag, an IP address of each forwarding node that a request direction passes through, an IP address of each forwarding node that a response direction passes through) included in the two flows, and a weight coefficient that is correspondingly set for each of the feature indicators.

In an example, a manner of calculating the similarity between two flows may be further: performing an and operation on multibits of feature indicators that correspond to the two flows; multiplying, by a weight coefficient corresponding to each of the feature indicators, results that are obtained through the and operation and that correspond to the feature indicators; and adding a plurality of products. For example, for two TCP flows in the DCN: a TCP flow 1 and a TCP flow 2. It is assumed that the TCP flow 1 includes a source IP: aaaa, a source port: bb, a destination IP: cccc, a destination port: dd, request connection time: efef, a request direction state flag: gggg, and a response direction state flag: hhhh. It is assumed that the TCP flow 2 includes: a source IP: iiii, a source port: jj, a destination IP: kkkk, a destination port: ll, request connection time: mnmn, a request direction state flag: oooo, and a response direction state flag: pppp. Corresponding weights are: a source IP: 0.1, a source port: 0.2, a destination IP: 0.1, a destination port: 0.2, request connection time: 0.2, a request direction state flag: 0.1, and a response direction state flag: 0.1. In this case, in the TCP flow 1 and the TCP flow 2, a similarity of feature indicators of the source IP is r1=0.1×(aaaa & iiii), where & represents the "and" operation. Similarly, a similarity of feature indicators of the source port is r2=0.2×(bb & jj). By analogy, a similarity r3 corresponding to the destination IP, a similarity r4 corresponding to the destination port, a similarity r5 corresponding to the request connection time, a similarity r6 corresponding to the request direction state flag, and a similarity r7 corresponding to the response direction state flag may be obtained. In this case, the similarity between the TCP flow 1 and the TCP flow 2 may be calculated as: R=r1+r2+ . . . +r6+r7.

It should be noted that the similarity between two flows may alternatively be calculated in another manner. For example, the and operation in the foregoing example is replaced with an or operation. Provided that an obtained calculation result can reflect a correlation degree between the two flows, any operation may be used for calculating a similarity of flows in this embodiment.

For example, the first network is a first DCN and a flow type is a TCP flow in the first DCN. It is assumed that a preset similarity threshold in the first DCN is 85%, and the first DCN includes a first success TCP flow 1, a first success TCP flow 2, and a first success TCP flow 3, and a first failure TCP flow 4. In this case, it may be first obtained through calculation that a similarity between the first success TCP flow 1 and the first failure TCP flow 4 is 80%, a similarity between the first success TCP flow 2 and the first failure TCP flow 4 is 50%, and a similarity between the first success TCP flow 3 and the first failure TCP flow 4 is 90%. Then, whether the plurality of similarities obtained through calculation are greater than 85% is separately compared, and it is found that only the similarity 90% between the first success TCP flow 3 and the first failure TCP flow 4 is greater than 85%. In this case, it is determined that the first success TCP flow 3 is a first target success TCP flow related to the first failure TCP flow 4.

In another example, that there is a high similarity between the first target success flow and the first failure flow may also be that the first N maximum similarities between the plurality of first success flows and the first failure flow in the first network are selected, where N is the preset value. It may be understood that N may be a quantity of first target success flows related to the first failure flow, and needs to be preset by a technical engineer by experience or depending on an actual network status.

In some cases, a value of N may be set based on an architecture complexity of the first network, to provide a sufficient data basis for subsequently determining a target fault root cause of the first failure flow. If the first network includes a relatively large quantity of forwarding nodes and has a complex structure, a relatively large quantity of first target success flows may be determined for the first failure flow. In other words, a more complex structure of the first network indicates a larger value of N. If the first network includes a relatively small quantity of forwarding nodes and has a relatively simple structure, a relatively small quantity of first target success flows may be determined for the first failure flow. In other words, a simpler structure of the first network indicates a smaller value of N, for example, N may be set to 1 (that is, one first target success flow has a highest similarity with the first failure flow is determined for the first failure flow).

For example, the first network is a first DCN, and the flow type is an IP flow in the first DCN. It is assumed that a preset value N in the first DCN is 2, and the first DCN includes a first success IP flow 1, a first success IP flow 2, a first success IP flow 3, and a first failure IP flow 4. In this case, it may be first obtained through calculation that a similarity between the first success IP flow 1 and the first failure IP flow 4 is 80%, a similarity between the first success IP flow 2 and the first failure IP flow 4 is 50%, a similarity between the first success IP flow 3 and the first failure IP flow 4 is 90%. Then, the plurality of first success IP flows are sorted in descending order based on the corresponding similarities. It can be understood that 90%>80%>50%, and the plurality of first success IP flows are sorted in descending order based on the similarities as follows: the first success IP flow 3, the first success IP flow 1, and the first success IP flow 2. In this case, two first success TCP flows corresponding to two maximum similarities are selected, that is, the first success TCP flow 3 and the first success TCP flow 1 that are ranked in the first two places are selected as the first target success IP flows related to the first failure TCP flow 4.

N=1 may indicate that only one first target success flow related to the first failure flow is determined from the plurality of first success flows, so that it can be ensured that the determined first target success flow is most related to the first failure flow. In this way, the target fault root cause of the first failure flow is determined more accurately, and this embodiment can be more widely applied to various networks, to provide better experience.

Figure 3:
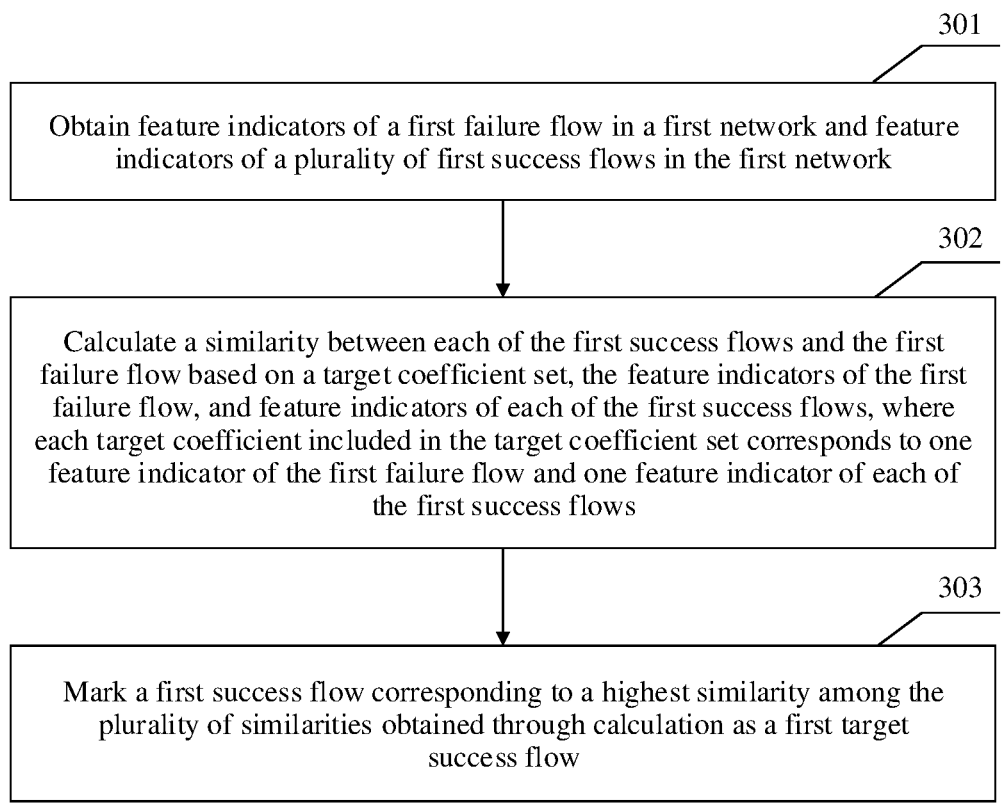
FIG. 3 is a schematic flowchart of an implementation of step according to an embodiment.

In some possible implementations, FIG. 3 shows a specific implementation of step 201, and the following step 301 to step 303 are included.

Step 301: Obtain feature indicators of the first failure flow in the first network and feature indicators of the plurality of first success flows in the first network.

It may be understood that, after the first failure flow is generated in the first network, the feature indicators recorded in the first failure flow may be extracted, and the plurality of first success flows in the first network are obtained, to extract the feature indicators recorded in the first success flows.

It should be noted that the plurality of first success flows in the first network may be triggered to update based on an architecture change or an IP address change in the network, or may periodically be triggered to update, which is not fixed. When the first target success flow is determined, in one case, for purposes of data comprehensiveness and analysis accuracy, the plurality of first success flows in the first network may be all current first success flows in the first network. In another case, to save resources and increase a processing rate, the plurality of first success flows in the first network may alternatively be some of all current first success flows in the first network, for example, a plurality of first success TCP flows generated in the latest 3 minutes are selected from all the current first success TCP flows.

A quantity of the feature indicators included in the first failure flow is substantially the same as a quantity of the feature indicators of each of the first success flows, that is, a length of the first failure flow may be the same as a length of each of the first success flows.

Step 302: Calculate a similarity between each of the first success flows and the first failure flow based on a target coefficient set, the feature indicators of the first failure flow, and the feature indicators of each of the first success flows, where each target coefficient included in the target coefficient set corresponds to one feature indicator of the first failure flow and one feature indicator of each of the first success flows.

It may be understood that the target coefficient set is a set including a plurality of target coefficients. Each target coefficient corresponds to one feature indicator in the flow, and is used to calculate a similarity between a value of the feature indicator in the first failure flow and a value of the feature indicator in the first success flow.

In an example, the similarity between the first failure flow and each of the first success flows may be calculated according to the following formula (1):

$$B_i = W_B \times (F \& S_i) \quad \text{formula (1)}$$

$W_B$ represents the target coefficient set, where j target coefficients $W_{Bj}$ are included; F represents the first failure flow; and $S_i$ represents the $i^{th}$ first success flow. After an and operation is performed on values of corresponding bits of the two groups of feature indicators, results obtained through the and operation are respectively multiplied by multibits formed by corresponding target coefficients $W_{Bj}$, then a plurality of products are added to obtain a similarity between the $i^{th}$ first success flow and the first failure flow, where i=1, 2, . . . , M. In this example, $W_{Bj}$ may be determined by using a multi-armed bandit algorithm, or may be determined in another implementation. This is not further limited herein.

For example, both the first failure flow and the first success flow are TCP flows. It is assumed that the first failure TCP flow includes feature indicators A, B, C, and D, a $1^{st}$ first success TCP flow correspondingly includes feature indicators $A_1$, $B_1$, $C_1$, and $D_1$, a $2^{nd}$ first success TCP flow correspondingly includes feature indicators $A_2$, $B_2$, $C_2$, and $D_2$, and the target coefficient set correspondingly includes target coefficients $W_{11}$, $W_{12}$, $W_{13}$, and $W_{14}$. Therefore, a similarity $B_1$ between the $1^{st}$ first success TCP flow and the first failure TCP flow is calculated according to the foregoing formula (1) as follows: $B_1 = W_{11} \times (A \& A_1) + W_{12} \times (B \& B_1) + W_{13} \times (C \& C_1) + W_{14} \times (D \& D_1)$. Similarly, a similarity $B_2$ between the $2^{nd}$ first success TCP flow and the first failure TCP flow may be calculated according to the foregoing formula (1) as follows: $B_2 = W_{11} \times (A \& A_2) + W_{12} \times (B \& B_2) + W_{13} \times (C \& C_2) + W_{14} \times (D \& D_2)$. By analogy, for each first success TCP flow, a similarity between the first success TCP flow and the first failure TCP flow may be calculated.

Step 303: Mark a first success flow corresponding to a highest similarity among the plurality of similarities obtained through calculation as the first target success flow.

The similarity between the first failure flow and each of the first success flows may be obtained through calculation in step 302, so that one or more highest similarities may be determined from the plurality of similarities, and the first success flow corresponding to the one or more highest similarities is marked as the first target success flow.

In an example, after a plurality of $B_i$ corresponding to the plurality of first success flows are obtained through calculation, a first success flow corresponding to the maximum $B_i$ may be selected as the first target success flow corresponding to the first failure flow according to the following formula (2):

$$I_B = \text{argmax}(B_i) \quad \text{formula (2)}$$

argmax( ) is used to obtain $S_i$ corresponding to a maximum value of $B_i$; and $I_B$ is $S_i$ corresponding to the determined maximum value of $B_i$, and is denoted as the first target success flow.

It should be noted that, in this implementation, the target coefficient set in step 302 may be determined based on a plurality of initial coefficient sets by using a reinforcement learning algorithm. For a specific implementation of determining the target coefficient set, refer to related descriptions of the following embodiment shown in FIG. 6. Details are not described herein.

In some other possible implementations, step 201 may be alternatively implemented in another manner. For example, the plurality of first success flows and the first failure flow in the first network are input into a trained third machine learning model, and the first target success flow is determined based on an output result of the third machine learning model.

It may be understood that the third machine learning model is used to determine, from the plurality of first success flows, the first target success flow that has the high similarity with the first failure flow. The third machine learning model is a trained model obtained by training a third initial machine learning model by using a large quantity of training sample sets. Each training sample in the training sample set may further include a plurality of success flows and a failure flow that belong to a same network.

To ensure processing accuracy of the trained third machine learning model, various training samples are required. For example, all training samples in the training sample set may come from a same network, but each training sample includes different failure flows; or the training samples in the training sample set may come from different networks.

It should be noted that a specific process of training the third machine learning model to obtain the trained third machine learning model is a process of determining a corresponding target coefficient set in the third machine learning model. For details, refer to related descriptions of the following embodiment shown in FIG. 6. Details are not described herein.

During specific implementation, because both the first success flow and the first failure flow include a plurality of feature indicators, to effectively determine the first target success flow related to the first failure flow from the plurality of first success flows in step 201, data format conversion may be first performed on the plurality of first success flows and the first failure flow before step 201, to obtain a plurality of first success flows and a first failure flow with a same data format. It should be noted that a preprocessing function of performing the data format conversion on the plurality of first success flows and the first failure flow may be implemented by a preprocessing module independent of a functional unit that implements step 201; or may be integrated into a functional unit that implements step 201, and is implemented by the functional unit that implements step 201.

For example, both the first failure flow and the first success flow are TCP flows. A data format of a first failure TCP flow and a data format of each of first success TCP flows are both converted into a preset data format. The preset data format is: a source IP, a source port, a destination IP, a destination port, request connection time, a request direction state flag, a response direction state flag, an IP address of each forwarding node that a request direction passes through, and an IP address of each forwarding node that a response direction passes through. In this way, step 201 is performed on a plurality of first success TCP flows and a first failure TCP flow that have the same data format after conversion, that is, feature indicators of each of the first success TCP flows and the first failure TCP flow may be correspondingly compared and learned in sequence. There is no need to search for, before the feature indicators are compared, that a feature indicator corresponding to which feature indicator in the first failure TCP flow is the feature indicator of the first success TCP flow, therefore, processing efficiency and accuracy of step 201 are improved.

In addition, step 201 may be alternatively implemented in another manner. For example, the first target success flow that has a similarity with the first failure flow is determined according to another calculation formula and a preset rule for determining a target similarity. The calculation formula and the preset rule for determining the target similarity may be set by a technical engineer based on an actual requirement or professional experience. Details are not described herein again.

It may be understood that the first target success flow, related to the feature indicators of the first failure flow, determined in step 201 provides a sufficient and effective data basis for learning the first failure flow by using the dual-channel first machine learning model in step 202, and provides a necessary prerequisite for identifying an accurate target fault root cause of the first failure flow.

Step 202: Determine the target fault root cause of the first failure flow based on the feature indicators of the first failure flow, the feature indicators of the first target success flow, and the trained first machine learning model.

In an example, the first failure flow and the first target success flow may be input into the trained first machine learning model, and the target fault root cause of the first failure flow is determined based on an output result of the first machine learning model.

It may be understood that the first machine learning model is used to learn the input first target success flow and the input first failure flow, and determine and output the output result corresponding to the target fault root cause of the first failure flow. The first machine learning model is a trained model obtained by training a constructed first machine learning model by using a large quantity of training sample sets. Each training sample in the training sample set may further include a plurality of success flows and a failure flow that belong to a same network.

To ensure processing accuracy of the trained first machine learning model, various training samples are required. For example, all training samples in the training sample set may come from a same network, but each training sample includes different failure flows; or the training samples in the training sample set may come from different networks.

During specific implementation, a process of training the first machine learning model to obtain the trained first machine learning model may further include: first, a plurality of second failure flows in a second network and a first known fault root cause corresponding to each of the second failure flows are determined. Then, a second target success flow related to each of the second failure flows is determined from a plurality of second success flows in the second network, where there is a high similarity between each of the second failure flows and the second target success flow related to the second failure flow. Then, training is performed based on feature indicators of the plurality of second failure flows, the first known fault root cause corresponding to each of the second failure flows, and feature indicators of the second target success flow related to each of the second failure flows, to obtain the first machine learning model.

In an example, the first machine learning model is trained to obtain the trained first machine learning model, and training samples in the training sample set that are used may include a second failure flow whose known fault root cause is the first fault root cause and a second target success flow related to the second failure flow in the second network. A process of training the initially constructed first machine learning model by using each training sample may further include: Step 1: input the second failure flow and the second target success flow into the first machine learning model, and determine a first learned fault root cause based on an output result. Step 2: determine whether the first learned fault root cause is consistent with the first known fault root cause; if the first learned fault root cause is inconsistent with the first known fault root cause, perform parameter adjustment on the first machine learning model, use a first machine learning model obtained through the parameter adjustment as the first machine learning model again, and continue to perform Step 1; and until the first learned fault root cause is consistent with the first known fault root cause, determine that a current first machine learning model is the trained first machine learning model mentioned in step 202.

Figure 4:
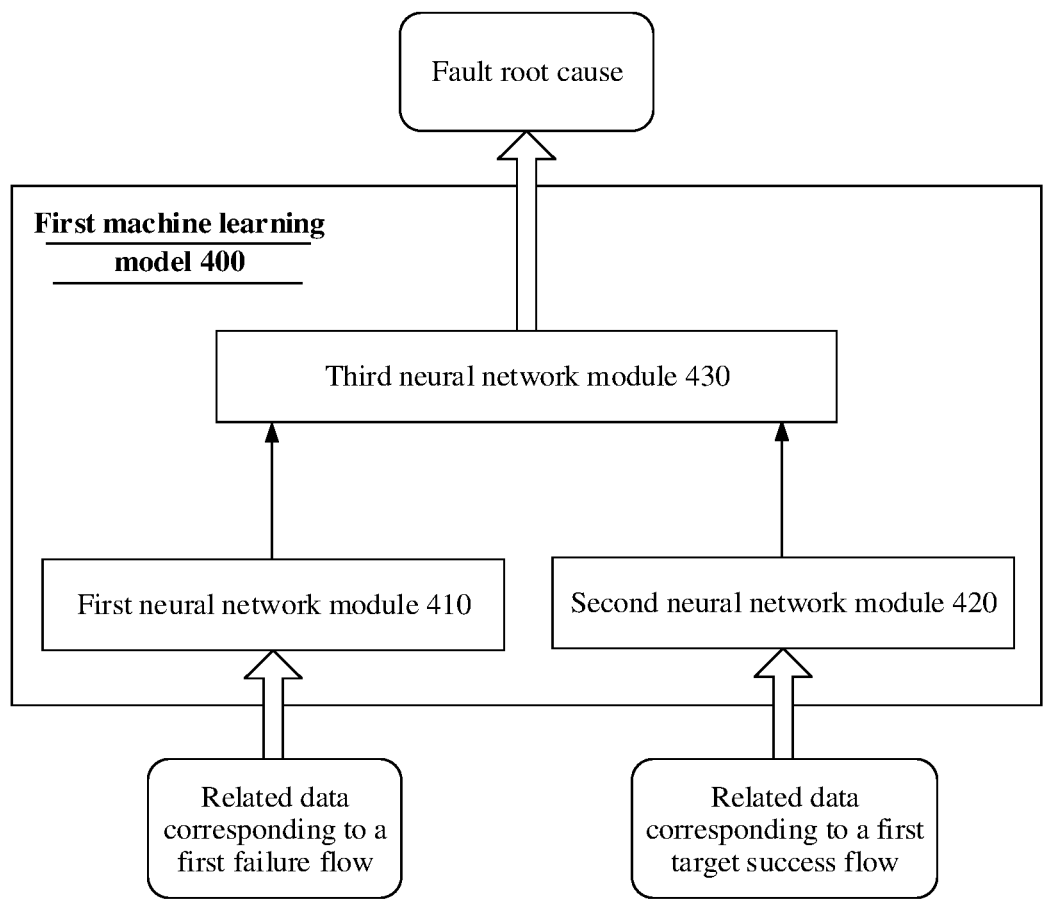
FIG. 4 is a schematic structural diagram of a first machine learning model according to an embodiment.

In some implementations, a structure of the first machine learning model is shown in FIG. 4. The first machine learning model 400 may further include a first neural network module 410, a second neural network module 420, and a third neural network module 430. A connection relationship and a signal transmission direction of each module in the first machine learning model 400 are further as follows. Input of the first neural network module 310 may be the first failure flow or related data obtained by processing the first failure flow. Input of the second neural network module 420 may be the first target success flow or related data obtained by processing the first target success flow. An output end of the first neural network module 410 and an output end of the second neural network module 420 are connected to an input end of the third neural network module 430. Output of the third neural network module 430 is output of the first machine learning model 400.

Figure 5:
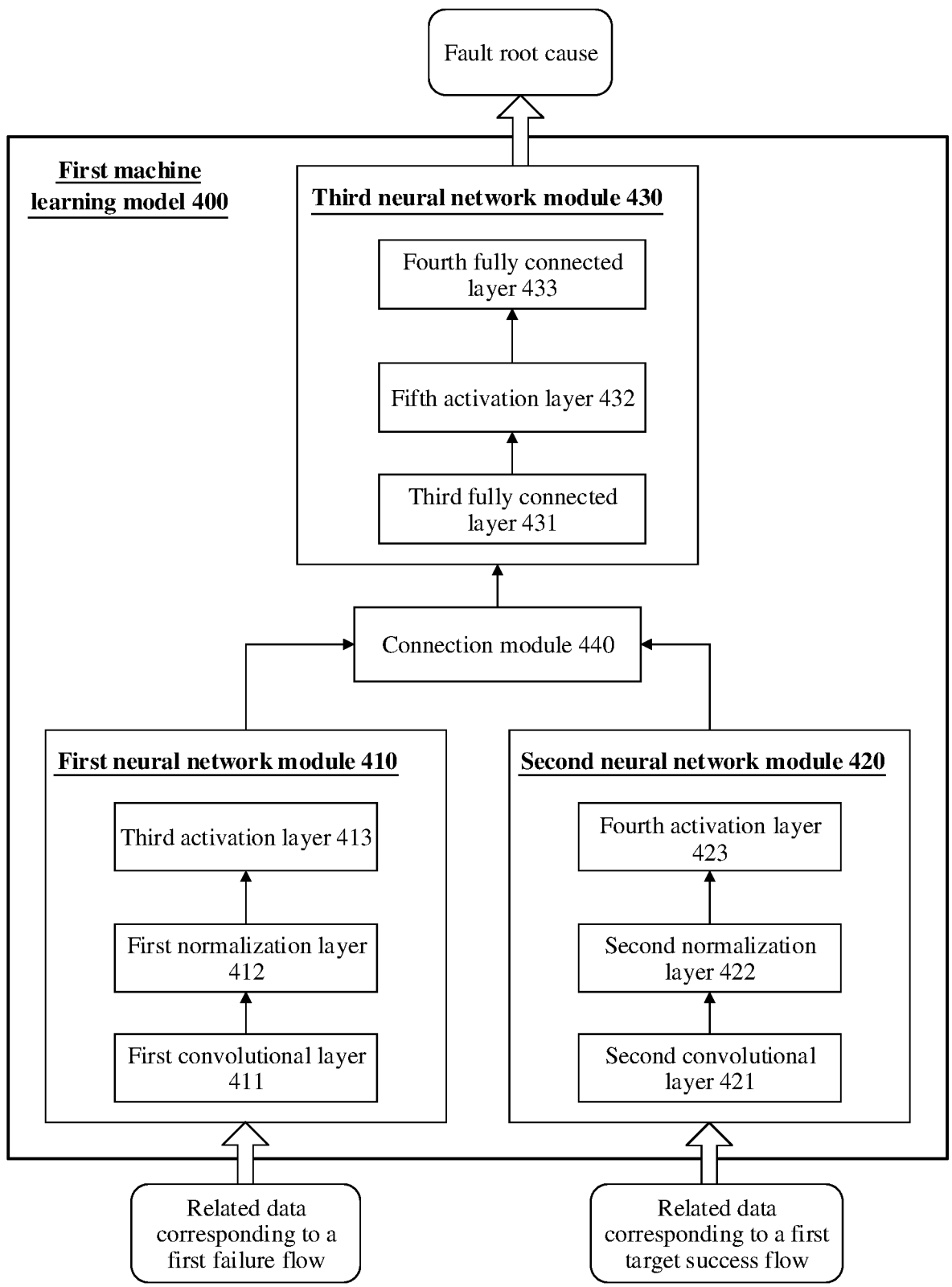
FIG. 5 is another schematic structural diagram of a first machine learning model according to an embodiment.

For details, refer to FIG. 5. The first neural network module 410 may sequentially include a first convolutional layer 411, a first normalization layer 412, and a third activation layer 413 in an order in which input data flows through the first neural network module 410. The second neural network module 420 may sequentially include a second convolutional layer 421, a second normalization layer 422, and a fourth activation layer 423 in an order in which input data flows through the second neural network module 420. The third neural network module 430 may sequentially include a third fully connected layer 431, a fifth activation layer 432, and a fourth fully connected layer 433 in an order in which input data flows through the third neural network module 430. In addition, a connection module 440 may be further included between the output end of the first neural network module 410 and the output end of the second neural network module 420 that are connected to the third neural network module 430. The connection module 440 is configured to connect data at the output end of the first neural network module 410 and data at the output end of the second neural network module 420, and then input the data to the third neural network module 430 for subsequent analysis.

It should be noted that the first machine learning model may be constructed not only by using a convolutional neural network or a fully connected network, but also by using other network algorithm such as a random forest network, a long short-term memory (LSTM) network, or a genetic algorithm network. Any network can be used as a network for constructing the first machine learning model, provided that the network can be used to learn the first failure flow and the first target success flow and output an output result corresponding to the target fault root cause of the first failure flow.

During specific implementation, after the first target success flow that has a similarity with the first failure flow is determined, the first failure flow and the first target success flow, or related data obtained by processing the first failure flow and the first target success flow may be input into the trained first machine learning model. The first machine learning model processes the input, and outputs an output result corresponding to the target fault root cause of the first failure flow. In one case, the output result may be the target fault root cause of the first failure flow, and the output result may be directly determined as the target fault root cause of the first failure flow. In another case, the output result may be an identifier corresponding to the target fault root cause of the first failure flow, and a target fault root cause corresponding to the identifier can be determined only by analyzing the output result. For example, an output result is a number ranging from 1 to n (n is an integer). Each number corresponds to one fault root cause. For example, 1 corresponds to IP offline, 2 corresponds to application offline, 3 corresponds to a security device layer exception, 4 corresponds to a routing device layer exception, 5 corresponds to a network port fault, and 6 corresponds to application overload. A correspondence is preset. When the output result of the first machine learning model is 1, it can be understood, based on the output result and the preset correspondence, that the target fault root cause corresponding to the first failure flow is IP offline.

It should be noted that for a same failure flow, there may be a plurality of fault causes for a connectivity fault for access corresponding to the failure flow. However, to facilitate identification of the fault root cause of the failure flow and subsequent network maintenance, a technical engineer may set, by experience or based on an actual situation, different priorities for the plurality of possible fault causes for the connectivity fault for access. If there are a plurality of causes for a connectivity fault for access, a cause with a highest priority may be used as a root cause of the connectivity fault for the access based on priorities of each of the causes, namely, a fault root cause corresponding to the failure flow.

After step 202, to quickly rectify the connectivity fault and enable the network to quickly provide high-quality services for users, this embodiment may further include: maintaining the first network based on the target fault root cause. In one case, the connectivity fault may be automatically and pertinently rectified based on the target fault root cause, to recover an access path. In another case, for a connectivity fault that cannot be automatically rectified, the target fault root cause may be sent to a maintenance management platform or a client of a maintenance engineer, to prompt the maintenance engineer to perform corresponding rectification.

It can be understood that, in this embodiment, the first target success flow related to the first failure flow is determined from the plurality of first success flows in the first network, that is, the first target success flow whose feature indicators are slightly different from the feature indicators of the first failure flow is determined. The first machine learning model that is repeatedly trained by using a large quantity of success flows and failure flows whose feature indicators are slightly different from each other may be used to accurately and quickly learn a difference between the feature indicators of the first failure flow and the feature indicators the first target success flow, so that the target fault root cause of the first failure flow can be accurately obtained based on an output result of the first learning model. In this way, the fault root cause of the connectivity fault that causes the failure flow in the network can be accurately identified, thereby reducing network maintenance costs and improving user experience in using the network.

After the fault root cause identification method in this embodiment is described, the following describes, with reference to the accompanying drawings, an implementation of determining, by using a reinforcement learning algorithm, the first target success flow related to the first failure flow in the embodiments.

Before the process is described, it should be noted that in the embodiments, the first network, the second network, and the third network may be a same network, or may be different networks. Similarly, the first success flow, the second success flow, and the third success flow may be a plurality of same success flows in a same network, may be a plurality of different success flows in a same network, or may be a plurality of different success flows in different networks. The first failure flow, the second failure flow, and the third failure flow may be different failure flows in a same network, or may be failure flows in different networks. This is not further limited in the embodiments.

It should be noted that the first failure flow, the plurality of first success flows, and the first target success flow need to be flows of a same type. Similarly, the second failure flow, the plurality of second success flows, and the second target success flow also need to be flows of a same type; and the third failure flow, the plurality of third success flows, and the third target success flow need to also be flows of a same type. For example, if the first failure flow is a UDP flow, the plurality of first success flows and the first target success flow also need to be UDP flows.

A reinforcement learning sample needs to include a plurality of success flows in the network, and also needs to include a failure flow with a known fault root cause. A manner of obtaining the failure flow in a training sample is as follows: In one case, an existing failure flow may be manually analyzed and checked by a technical engineer, so as to obtain a fault root cause corresponding to the failure flow. In another case, a failure flow may be obtained by manually manufacturing and determining a connectivity fault, and a known fault root cause of the failure flow is a fault cause corresponding to the manually manufactured connectivity fault. For example, for access in the network, a failure flow corresponding to a known fault root cause may be obtained by manually disabling some IPs, making some applications offline, changing some firewall policies, changing some route forwarding paths, creating some overload applications, or the like.

Figure 6:
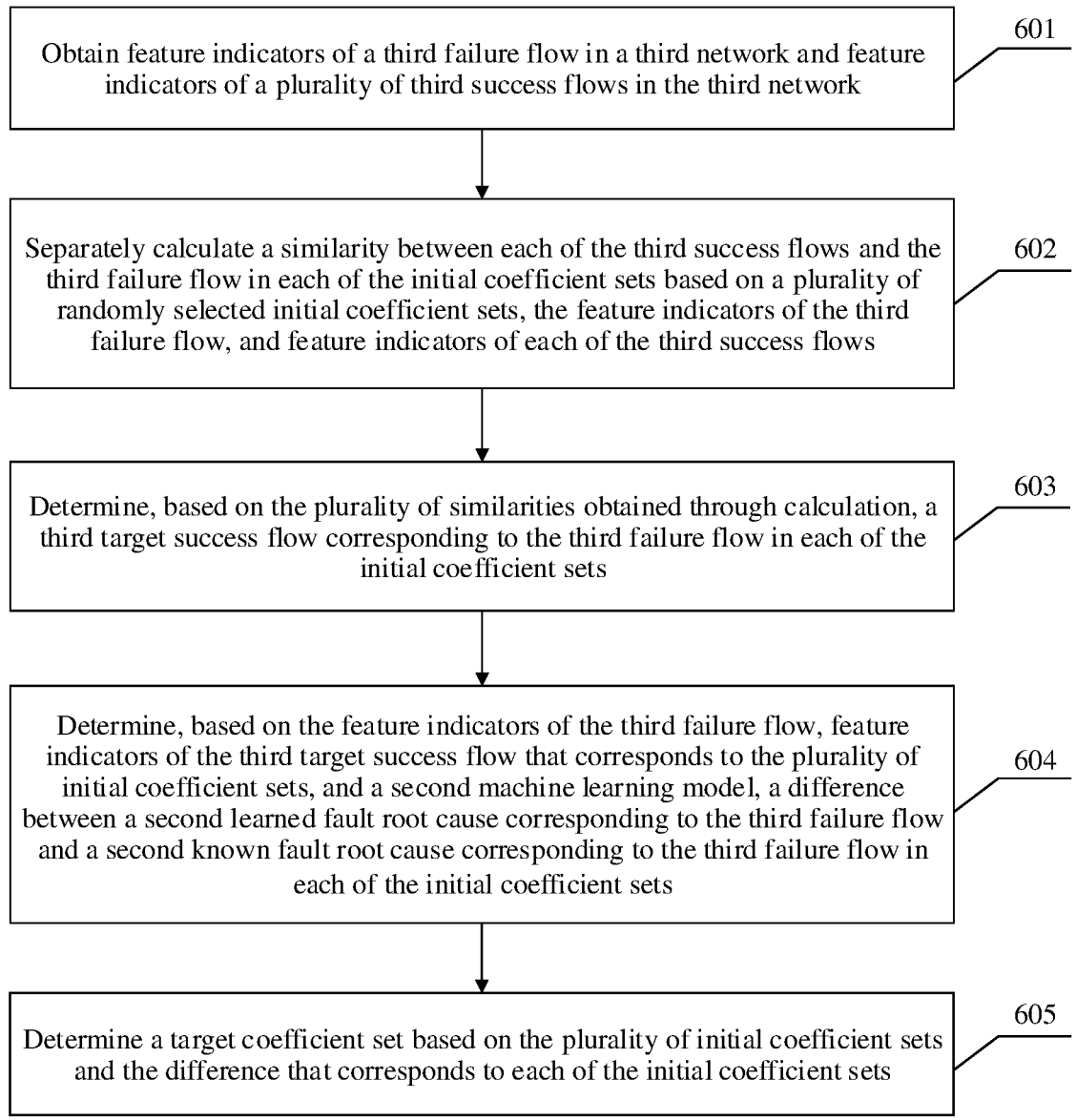
FIG. 6 is a flowchart of a method for determining a target coefficient set in step according to an embodiment.

During specific implementation, to ensure that the first machine learning model can accurately determine the target fault root cause for the first failure flow after the first failure flow is input into the trained first machine learning model, it needs to be determined that the first target success flow that has the high similarity with the first failure flow can be accurately determined. In this case, the target coefficient set that can be used to accurately calculate the similarity between each of the first success flows and the first failure flow needs to be determined. A specific determining method is shown in FIG. 6, and may include the following step 601 to step 605.

Step 601: Obtain feature indicators of a third failure flow in a third network and feature indicators of a plurality of third success flows in the third network.

It may be understood that a training sample may be determined in advance in a training sample set. The training sample may include the plurality of third success flows in the third network, and the third failure flow whose fault root cause is a second known fault root cause. In this case, the feature indicators of the flows in the training sample are obtained according to step 601. This provides a data basis for subsequently calculating the similarity to determine the target coefficient set.

Step 602: Separately calculate a similarity between each of the third success flows and the third failure flow in each of the initial coefficient sets based on a plurality of randomly selected initial coefficient sets, the feature indicators of the third failure flow, and feature indicators of each of the third success flows.

It may be understood that each of the plurality of initial coefficient sets may include a fixed quantity of initial coefficients, and the fixed quantity may be determined based on a quantity of feature indicators included in each flow in the third network.

In an example, the plurality of initial coefficient sets may be generated by using a multi-armed bandit algorithm. A specific generation process includes: determining that each initial coefficient set includes L initial coefficients (L is a positive integer), and presetting that each of the initial coefficients includes n states, where for example, n=5, and five states may be respectively preset as 0, 0.2, 0.4, 0.6, and 0.8. In this case, the multi-armed bandit includes $n^L$ rocker arms, and each rocker arm corresponds to one initial coefficient set.

During specific implementation, an e-greedy algorithm may be used to randomly select, from the plurality of initial coefficient sets, an initial coefficient set on which reinforcement learning currently needs to be performed. A specific implementation is as follows. Assuming that e is preset to 0.8, before the initial coefficient set is selected, a random number a is generated. If a<e, an initial coefficient set is randomly selected from all the initial coefficient sets as the initial coefficient set on which reinforcement learning is to be performed. If a≥e, an initial coefficient set with a best reinforcement learning effect (namely, an initial coefficient set that can be used so that a difference between a determined second learned fault root cause corresponding to the third failure flow and the second known fault root cause corresponding to the third failure flow is minimum) is selected from initial coefficient set obtained by performing reinforcement learning, and reinforcement learning is performed again on the initial coefficient set with a best reinforcement learning effect. In this way, this can ensure randomness of the selected initial coefficient set, and a plurality of times of reinforcement learning can also be performed on an initial coefficient with a better reinforcement learning effect. In other words, this can ensure comprehensiveness of selected data, and improve data effectiveness, so that the reinforcement learning can be converged more quickly and better.

In another example, assuming that each initial coefficient set includes L initial coefficients, a preset quantity of initial coefficient sets may be generated, and each initial coefficient set includes five initial coefficients that are randomly generated.

During specific implementation, after the initial coefficient set on which reinforcement learning is to be performed is determined, the similarity between each of the third success flows and the third failure flow in each randomly selected initial coefficient set may be calculated according to the foregoing formula (1) and based on each initial coefficient set, the feature indicators of the third failure flow, and the feature indicators of each of the third success flows that are obtained in step 601.

Step 603: Determine, based on the plurality of similarities obtained through calculation, the third target success flow corresponding to the third failure flow in each of the initial coefficient sets.

It may be understood that one or more highest similarities may be determined from the plurality of similarities, and the third success flow corresponding to the one or more highest similarities is recorded as the third target success flow. In an example, the third target success flow corresponding to the third failure flow in the initial coefficient set may be calculated according to the foregoing formula (2).

Step 604: Determine, based on the feature indicators of the third failure flow, feature indicators of the third target success flow that corresponds to the plurality of initial coefficient sets, and a second machine learning model, a difference between the second learned fault root cause corresponding to the third failure flow and the second known fault root cause corresponding to the third failure flow in each of the initial coefficient sets.

During specific implementation, the third target success flow corresponding to the plurality of initial coefficient sets and the third failure flow are both input into the second machine learning model, and the difference between the second learned fault root cause corresponding to the third failure flow and the second known fault root cause corresponding to the third failure flow in each of the initial coefficient sets is determined based on an output result of the second machine learning model.

It may be understood that the second machine learning model may be a machine learning model whose structure is constructed the same as a structure of the first machine learning model, or may be a first machine learning model in any training state. This is not further limited herein. Input of the second machine learning model may be any failure flow and a determined target success flow corresponding to the failure flow. Output of the second machine learning model may indicate a learned fault root cause of the failure flow.

During specific implementation, first, the second learned fault root cause corresponding to the third failure flow in each of the initial coefficient sets may be determined based on the output result of the second machine learning model. Then, the second learned fault root cause may be compared with the second known fault root cause corresponding to the third failure flow, to determine the difference between the second learned fault root cause and the second known fault root cause. It should be noted that the difference may be used to reflect a difference between accuracy of determining, by using an initial coefficient set, a target success flow corresponding to a failure flow and accuracy of determining, by using a target coefficient set, the target success flow corresponding to the failure flow.

Figure 7:
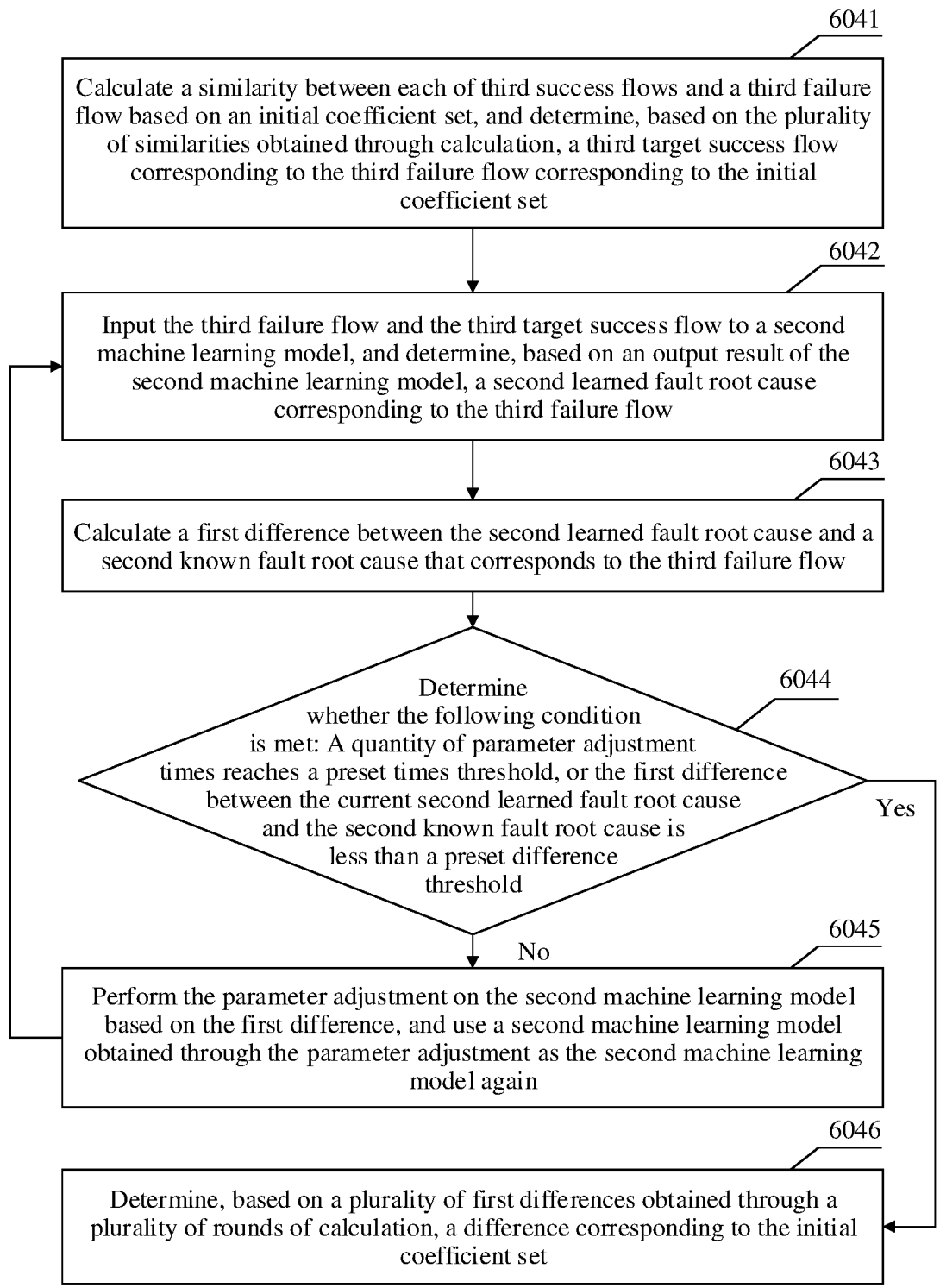
FIG. 7 is a schematic flowchart of an implementation of step according to an embodiment.

In an example, as shown in FIG. 7, for each initial coefficient set, a process of performing step 604 may further include the following steps.

Step 6041: Calculate a similarity between each of the third success flows and the third failure flow based on an initial coefficient set, and determine, based on the plurality of similarities obtained through calculation, the third target success flow corresponding to the third failure flow corresponding to the initial coefficient set.

It should be noted that, for a specific implementation process, refer to related descriptions in step 602 and step 603.

Step 6042: Input the third failure flow and the third target success flow to the second machine learning model, and determine, based on an output result of the second machine learning model, the second learned fault root cause corresponding to the third failure flow.

It should be noted that, for a specific implementation process, refer to related descriptions in step 202.

Step 6043: Calculate a first difference between the second learned fault root cause and the second known fault root cause that corresponds to the third failure flow.

It may be understood that the second known learned fault root cause is different from the second learned fault root cause output by the second machine learning model. The difference is caused by two reasons: First, the second machine learning model is not the trained first machine learning model. Second, there is a difference between a determined third target success flow and a target success flow related to the third failure flow.

During specific implementation, the second learned fault root cause may be compared with the second known fault root cause to obtain the first difference, where the first difference is used to indicate a difference that exists in a current reinforcement learning state.

Step 6044: Determine whether the following condition is met: a quantity of parameter adjustment times reaches a preset times threshold, or the first difference between the current second learned fault root cause and the second known fault root cause is less than a preset difference threshold; and perform step 6045 if the foregoing condition is not met, or perform step 6046 if the foregoing condition is met.

It should be noted that, to reduce the first difference caused because the second machine learning model is not the trained first machine learning model, a plurality of rounds of learning may be performed on the second machine learning model on a basis of determining the third target success flow by using a same initial coefficient set, and a first difference determined based on an output result of a second machine learning model obtained by each round of learning is recorded, to determine a relative accuracy difference caused by a difference between the determined third target success flow and the target success flow related to the third failure flow in the initial coefficient set, thereby providing an effective data basis for subsequently determining the target coefficient set.

It may be understood that, the plurality of rounds of learning performed on the second machine learning model may end based on the following condition. In one case, the preset quantity threshold (for example, 100) may be preset. 100 rounds of learning need to be performed on the second machine learning model, and 100 first differences obtained through the 100 rounds of learning are correspondingly obtained. In another case, the preset difference threshold may be preset. It may be understood that, in the process of performing the plurality of rounds of learning on the second machine learning model, an output second learned fault root cause is basically approaching the second known fault root cause, that is, the obtained first difference tends to be decreasing. Therefore, the learning performed on the second machine learning model may end when a first difference is less than the preset difference threshold, to obtain a plurality of first differences.

After one round of learning, it is determined whether the end condition of the plurality of rounds of learning performed on the second machine learning model is met. When the end condition is not met, a next round of learning continues, that is, step 6045 is performed. If the end condition is met, the plurality of rounds of learning may end, and step 6046 is performed.

Step 6045: Perform the parameter adjustment on the second machine learning model based on the first difference, use a second machine learning model obtained through the parameter adjustment as the second machine learning model again, and continue to perform step 6042.

It may be understood that, when a quantity of rounds of learning performed on the second machine learning model does not reach a specific quantity, or a preset effect of learning performed on the second machine learning model is not achieved, a next round of learning may be performed on the second machine learning model. First, parameter adjustment may be performed on the second machine learning model based on a first difference generated after a current round of learning. A second machine learning model obtained through adjustment is used as a new second machine learning model. Then, the third failure flow and the third target success flow are input into the second machine learning model obtained through adjustment, and a new second learned fault root cause corresponding to the third failure flow is determined based on an output result of the second machine learning model obtained through adjustment. Finally, a first difference between the new second learned fault root cause and the second known fault root cause is calculated. This process is repeated until the end condition of the plurality of rounds of learning performed on the second machine learning model is met.

Step 6046: Determine, based on a plurality of first differences obtained through the plurality of rounds of calculation, a difference corresponding to the initial coefficient set.

During specific implementation, the plurality of first differences between the second known fault root cause of the third failure flow and the plurality of second learned fault root causes in the initial coefficient set may be obtained by performing step 6041 to step 6045 for a plurality of times. In this case, the difference corresponding to the initial coefficient set, namely, "a difference between the second learned fault root cause corresponding to the third failure flow and the second known fault root cause corresponding to the third failure flow" mentioned in step 604, may be determined based on the plurality of first differences.

In an example, a sum of the plurality of first differences may be used as the difference corresponding to the initial coefficient set. In another example, the plurality of first differences may be averaged, and an obtained average value is used as the difference corresponding to the initial coefficient set. In still another example, weighted values corresponding to the plurality of first differences may be set based on contribution of each round of learning to the target coefficient set, and a weighted value between a first difference and a weight corresponding to the first difference is used as the difference corresponding to the initial coefficient set.

It should be noted that, for an initial coefficient set selected each time, step 602 to step 604 may be performed to determine a difference between the second learned fault root cause corresponding to the third failure flow and the second known fault root cause corresponding to the third failure flow in each of the initial coefficient sets. When step 604 is performed each time, the embodiment shown in FIG. 7 may be performed, to improve accuracy of the determined difference. In addition, to perform processing under a same reference for each initial coefficient set, after processing on an initial coefficient set is completed, the second machine learning model needs to be restored to a state before adjustment when step 602 is performed on a next initial coefficient set.

Step 605: Determine the target coefficient set based on the plurality of initial coefficient sets and the difference that corresponds to each of the initial coefficient sets.

In an example, step 605 may be further implemented in a selection manner. For example, an initial coefficient set corresponding to a minimum difference is directly selected from the plurality of initial coefficient sets as the target coefficient set.

In another example, step 605 may be further implemented in a fitting manner. For example, fitting is performed on the plurality of initial coefficient sets and the difference that corresponds to each of the initial coefficient sets, and a coefficient set corresponding to a minimum value point in a fitting result is determined as the target coefficient set. It should be noted that the target coefficient set may be an initial coefficient set in the plurality of initial coefficient sets; or may not belong to the plurality of initial coefficient sets, and is a completely different coefficient set. For example, a shallow neural network is used to simulate a "rocker arm-difference" table, to determine a target rocker arm corresponding to the minimum difference, and read a target coefficient set corresponding to the target rocker arm.

The target coefficient set is determined in the implementation shown in FIG. 6, so that the first target success flow related to the to-be-processed first failure flow can be accurately determined, that is, the first target success flow whose feature indicators are slightly different from the feature indicators of the first failure flow is determined. This provides an effective data basis for subsequently processing the first failure flow by using the first machine learning model that is repeatedly trained by using a large quantity of success flows and failure flows whose feature indicators are slightly different from each other. In other words, the first machine learning model can accurately output the target fault root cause of the first failure flow based on the difference between the feature indicators of the first target success flow and the feature indicators of the first failure flow. In this way, the fault root cause can be analyzed and determined without requiring technical engineers, and problems that the fault root cause determined in a manner, for example, in the manner shown in FIG. 1, is not accurate and the machine learning model cannot be generalized are also resolved, thereby reducing network maintenance costs and improving user experience in using the network.

It should be noted that the target coefficient set may be alternatively obtained through training in another manner, provided that an accurate fault root cause that can effectively identify the failure flow can be determined based on the obtained target coefficient set in combination with the trained first machine learning model. The determined target coefficient set may be encapsulated into a model file and integrated into an independent server, or may be encapsulated into a server together with the first machine learning model in a form of a model file. The determined target coefficient set is generalized in various networks, thereby reducing the network maintenance costs and improving user experience in using the network.

Figure 8:
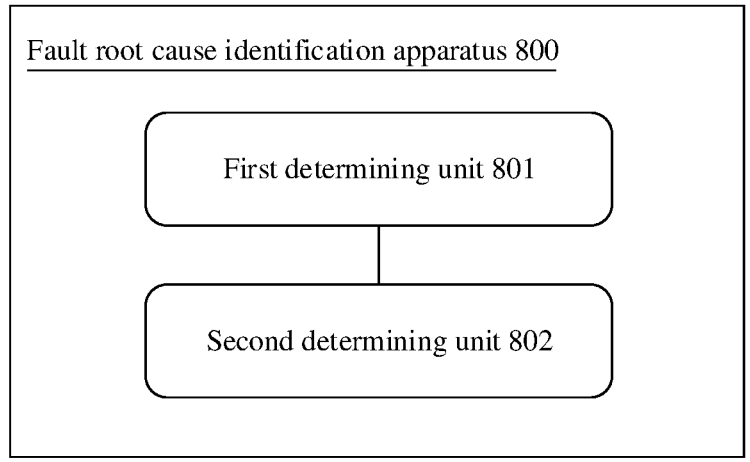
FIG. 8 is a schematic structural diagram of a fault root cause identification apparatus according to an embodiment.

As shown in FIG. 8, an embodiment further shows a fault root cause identification apparatus 800 according to the embodiments. The apparatus 800 may include a first determining unit 801 and a second determining unit 802.

During specific implementation, the apparatus may be configured to execute the corresponding fault root cause identification method in FIG. 2. An example is described as follows.

The first determining unit 801 is configured to determine, from a plurality of first success flows based on a first failure flow in a first network, a first target success flow related to the first failure flow, where there is a high similarity between the first target success flow and the first failure flow. The second determining unit 802 is configured to determine a target fault root cause of the first failure flow based on feature indicators of the first failure flow, feature indicators of the first target success flow, and a trained first machine learning model.

Therefore, the fault root cause identification apparatus provided in this embodiment can determine the target success flow that has the similarity with the failure flow from the plurality of success flows in the network, that is, the target success flow whose feature indicators are slightly different from feature indicators of the failure flow is determined. In combination with the first machine learning model repeatedly trained by using a large quantity of success flows and failure flows whose feature indicators are slightly different each other, the fault root cause identification apparatus can accurately learn a difference between the feature indicators of the to-be-analyzed failure flow and the feature indicators of the target success flow related to the to-be-analyzed failure flow, so that the target fault root cause of the failure flow can be accurately output based on the feature indicators that are slightly different each other. In this way, the fault root cause of a connectivity fault that causes the failure flow can be accurately identified, thereby reducing network maintenance costs and improving user experience in using the network.

Optionally, this embodiment may further include a training process of the first machine learning model. The process is further implemented by a third determining unit, a fourth determining unit, and a training unit that are of the apparatus. In this embodiment the apparatus further includes: the third determining unit, configured to determine a plurality of second failure flows in a second network and a first known fault root cause corresponding to each of the second failure flows; the fourth determining unit, configured to determine, from a plurality of second success flows in the second network, a second target success flow related to each of the second failure flows, where there is a high similarity between each of the second failure flows and the second target success flow related to the second failure flow; and the training unit, configured to perform training based on feature indicators of the plurality of second failure flows, the first known fault root cause corresponding to each of the second failure flows, and feature indicators of the second target success flow related to each of the second failure flows, to obtain the first machine learning model.

The flows mentioned in the apparatus embodiment, for example, the first failure flow, the first target success flow, the plurality of first success flows, the plurality of second failure flows, the second target success flow related to each of the second failure flows, and the plurality of second success flows, are all TCP flows, IP flows, or UDP flows. It may be understood that the first failure flow, the first target success flow, and the plurality of first success flows are flows of a same type. Similarly, the plurality of second failure flows, the second target success flow related to each of the second failure flows, and the plurality of second success flows also need to be flows of a same type.

It may be understood that, that there is a high similarity between the first target success flow and the first failure flow is further: the similarity between the first target success flow and the first failure flow is greater than a preset similarity threshold. Alternatively, the similarity between the first target success flow and the first failure flow belongs to first N maximum similarities between the plurality of first success flows and the first failure flow in the first network, where N is a preset value.

Optionally, the first determining unit 801 of the apparatus may further include: an obtaining subunit, configured to obtain the feature indicators of the first failure flow in the first network and feature indicators of the plurality of first success flows in the first network; a calculation subunit, configured to calculate a similarity between each of the first success flows and the first failure flow based on a target coefficient set, the feature indicators of the first failure flow, and the feature indicators of each of the first success flows, where each target coefficient included in the target coefficient set corresponds to one feature indicator of the first failure flow and one feature indicator of each of the first success flows; and a first determining subunit, configured to mark a first success flow corresponding to a highest similarity among the plurality of similarities obtained through calculation as the first target success flow.

A process of determining the target coefficient set may be further included in this implementation, and may be further implemented by an obtaining unit, a calculation unit, a fifth determining unit, a sixth determining unit, and a seventh determining unit in the apparatus. For example, the apparatus further includes: the obtaining unit, configured to obtain feature indicators of the third failure flow in a third network and feature indicators of a plurality of third success flows in the third network; the calculation unit, configured to separately calculate, based on a plurality of randomly selected initial coefficient sets, the feature indicators of the third failure flow, and feature indicators of each of the third success flows, a similarity between each of the third success flows and the third failure flow in each of the initial coefficient sets; the fifth determining unit, configured to determine, based on the plurality of similarities obtained through calculation, the third target success flow corresponding to the third failure flow in each of the initial coefficient sets; the sixth determining unit, configured to determine, based on the feature indicators of the third failure flow, feature indicators of the third target success flow that corresponds to the plurality of initial coefficient sets, and a second machine learning model, a difference between a second learned fault root cause corresponding to the third failure flow and a second known fault root cause corresponding to the third failure flow in each of the initial coefficient sets; and the seventh determining unit, configured to determine the target coefficient set based on the plurality of initial coefficient sets and the difference that corresponds to each of the initial coefficient sets. The initial coefficient sets may be randomly selected by using an e-greedy algorithm.

In an example, the foregoing "the sixth determining unit" may be further implemented in the following manner: a third determining subunit is configured to calculate the similarity between each of the third success flows and the third failure flow based on each initial coefficient set, and determine, based on the plurality of the similarities obtained through calculation, the third target success flow corresponding to the third failure flow corresponding to each initial coefficient set. A processing subunit is configured to input the third failure flow and the third target success flow into the second machine learning model, determine, based on an output result of the second machine learning model, the second learned fault root cause corresponding to the third failure flow, and calculate a first difference between the second learned fault root cause and the second known fault root cause corresponding to the third failure flow. An adjustment subunit is configured to perform parameter adjustment on the second machine learning model based on the first difference, use a second machine learning model obtained through the parameter adjustment as the second machine learning model again, and go back to trigger the processing subunit to perform. Until a quantity of parameter adjustment times reaches a preset quantity threshold, or a first difference between a current second learned fault root cause and the second known fault root cause is less than a preset difference threshold, a fourth determining subunit is triggered to be further configured to determine, based on a plurality of first differences obtained through calculation, a difference corresponding to each initial coefficient set.

Optionally, the seventh determining unit may further include: a fitting subunit, configured to perform fitting on the plurality of initial coefficient sets and the difference that corresponds to each of the initial coefficient sets; and a second determining subunit, configured to determine a coefficient set corresponding to a minimum value point in a fitting result as the target coefficient set.

It may be understood that the target fault root cause includes IP offline, application offline, a security device layer exception, a routing device layer exception, a network port error, or application overload.

Optionally, to quickly rectify the connectivity fault and enable the network to quickly provide high-quality services for users, the apparatus provided in this embodiment may further include: a maintenance unit, configured to maintain the first network based on the target fault root cause.

In addition, the first determining unit 801 and the second determining unit 802 in the fault root cause identification apparatus 800 may further implement other operations or functions in the foregoing method, and details are not described herein.

It should be noted that, for implementation effects of the fault root cause identification apparatus 800 in this embodiment, refer to related descriptions in the method embodiment corresponding to FIG. 2. Details are not described herein again.

Figure 9:
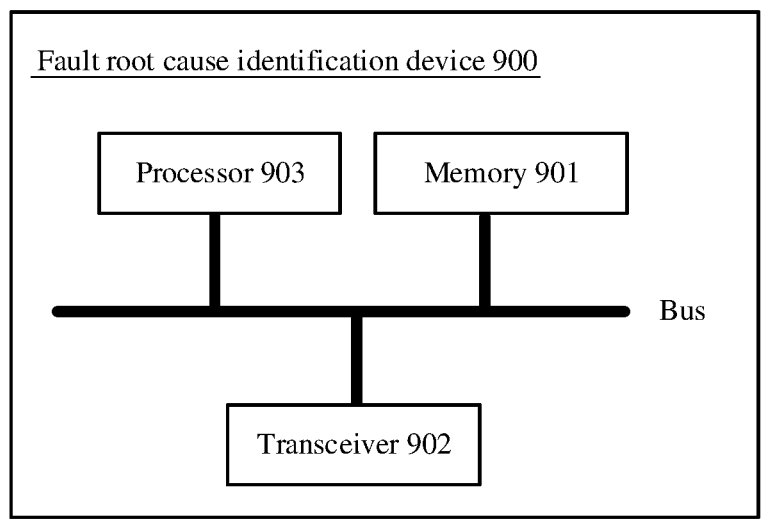
FIG. 9 is a schematic structural diagram of a fault root cause identification device according to an embodiment.

FIG. 9 is a possible schematic structural diagram of a fault root cause identification device according to the foregoing embodiments. As shown in FIG. 9, the fault root cause identification device 900 includes a memory 901, a transceiver 902, and a processor 903. The memory 901 is configured to be coupled to the processor 903, and the memory 901 stores a necessary computer program of the fault root cause identification device 900.

During specific implementation, the processor 903 is configured to process corresponding functions in the foregoing method in the embodiment shown in FIG. 2 performed by the fault root cause identification device 900. The transceiver 902 is configured to implement communication between the foregoing fault root cause identification device 900 and another device. The fault root cause identification device 900 may further include the memory 901. The memory 901 is configured to be coupled to the processor 903, and the memory 901 stores program instructions and data that are necessary for the fault root cause identification device 900.

It may be understood that the fault root cause identification device 900 may use the processor 903 to execute, according to the computer-readable instructions in the memory 901, content corresponding to FIG. 2, for example, steps 201 and 202, content corresponding to FIG. 3, for example, steps 301 to 303, content corresponding to FIG. 6, for example, steps 601 to 605, and content corresponding to FIG. 7, for example, steps 6041 to 6046. In addition, the identification device 900 may further use the processor 903 to perform, according to the computer-readable instructions in the memory 901, the machine learning model shown in FIG. 1, FIG. 4, or FIG. 5, to implement fault root cause analysis. The fault root cause identification device 900 may alternatively be the fault root cause identification apparatus 800 in the embodiment corresponding to FIG. 8. It should be noted that units (for example, the first determining unit 801 and the second determining unit 802) of the fault root cause identification apparatus 800 may be software units or hardware units. If the units in the fault root cause identification apparatus 800 are the software units, these software units may be software units stored in the computer-readable instructions in the memory 901 of the fault root cause identification device 900. If the units in the fault root cause identification apparatus 800 are the hardware units, in an example, any unit in the identification apparatus 800 may be understood as being implemented based on the processor 903, the memory 901, and the computer-readable instructions that are used to implement a function of the unit in the memory 901.

It should be noted that, for implementation effects of the fault root cause identification device 900 in this embodiment, refer to related descriptions in the method embodiment corresponding to FIG. 2. Details are not described herein again.

"First" in names such as "the first network" and "the first failure flow" mentioned in the embodiments is merely used as a name identifier and does not represent first in sequence. This rule is also applicable to "second" and the like.

From the foregoing descriptions of the implementations, a person of ordinary skill in the art may clearly understand that some or all steps of the methods in the embodiments may be implemented by software in addition to a universal hardware platform. Based on such understanding, solutions may be implemented in a form of a software product. The software product may be stored in a storage medium, such as a read-only memory (ROM), a random access memory (RAM), a magnetic disk, or an optical disc; and includes several instructions for instructing a computer device (which may be a personal computer, a server, or a network communications device such as a router) to perform the methods described in the embodiments or some parts of the embodiments.

The embodiments are all described in a progressive manner, for same or similar parts in the embodiments, refer to each other, and each embodiment focuses on a difference from other embodiments. Further, apparatus and device embodiments are substantially similar to a method embodiment, and therefore are described briefly; for related parts, refer to partial descriptions in the method embodiment. The described apparatus and device embodiments are merely examples. The modules described as separate parts may or may not be physically separated, and parts shown as modules may or may not be physical modules, may be located in one position, or may be distributed on a plurality of network units. Some or all of the modules may be selected according to actual requirements to achieve the objectives of the solutions of the embodiments. A person of ordinary skill in the art may understand and implement the embodiments of the present invention without creative efforts.

The foregoing descriptions are merely example implementations, and are non-limiting.

What is claimed is:

1. A fault root cause identification method, comprising:
    determining, from a plurality of first success flows based on a first failure flow in a first network, a first target success flow related to the first failure flow, wherein there is a similarity between the first target success flow and the first failure flow if a first preset condition is met;
    determining a target fault root cause of the first failure flow based on feature indicators of the first failure flow, feature indicators of the first target success flow, and a trained first machine learning model;
    determining a plurality of second failure flows in a second network and a first known fault root cause corresponding to each of the second failure flows;
    determining, from a plurality of second success flows in the second network, a second target success flow related to each of the second failure flows, wherein there is a similarity between each of the second failure flows and the second target success flow related to the second failure flow if a second preset condition is met; and
    obtaining the first machine learning model by performing training based on feature indicators of the plurality of second failure flows, the first known fault root cause corresponding to each of the second failure flows, and feature indicators of the second target success flow related to each of the second failure flows.

2. The method according to claim 1, wherein the first failure flow, the first target success flow, the plurality of first success flows, the plurality of second failure flows, the second target success flow related to each of the second failure flows, and the plurality of second success flows are all transmission control protocol (TCP) flows, internet protocol (IP) flows, or user datagram protocol (UDP) flows.

3. The method according to claim 1, wherein the similarity between the first target success flow and the first failure flow met a first preset condition further comprises:
    the similarity between the first target success flow and the first failure flow is greater than a preset similarity threshold; or the similarity between the first target success flow and the first failure flow belongs to first N maximum similarities between the plurality of first success flows and the first failure flow in the first network, wherein N is a preset value.

4. The method according to claim 1, wherein the determining, from a plurality of first success flows based on a first failure flow in a first network, of a first target success flow related to the first failure flow comprises:
    obtaining the feature indicators of the first failure flow in the first network and feature indicators of the plurality of first success flows in the first network;
    calculating a similarity between each of the first success flows and the first failure flow based on a target coefficient set, the feature indicators of the first failure flow, and the feature indicators of each of the first success flows, wherein each target coefficient comprised in the target coefficient set corresponds to one feature indicator of the first failure flow and one feature indicator of each of the first success flows; and
    marking a first success flow corresponding to a highest similarity among a plurality of similarities obtained through calculation as the first target success flow.

5. The method according to claim 4, further comprising:
obtaining feature indicators of a third failure flow in a third network and feature indicators of a plurality of third success flows in the third network;
separately calculating a similarity between each of the third success flows and the third failure flow in each of the initial coefficient sets based on a plurality of randomly selected initial coefficient sets, the feature indicators of the third failure flow, and feature indicators of each of the third success flows;
determining, based on the plurality of similarities obtained through calculation, a third target success flow corresponding to the third failure flow in each of the initial coefficient sets;
determining, based on the feature indicators of the third failure flow, feature indicators of the third target success flow that corresponds to the plurality of initial coefficient sets, and a second machine learning model, a difference between a second learned fault root cause corresponding to the third failure flow and a second known fault root cause corresponding to the third failure flow in each of the initial coefficient sets; and
determining the target coefficient set based on the plurality of initial coefficient sets and the difference that corresponds to each of the initial coefficient sets.

6. The method according to claim 5, wherein the determining of the target coefficient set based on the plurality of initial coefficient sets and the difference that corresponds to each of the initial coefficient sets comprises:
performing fitting on the plurality of initial coefficient sets and the difference that corresponds to each of the initial coefficient sets; and
determining a coefficient set corresponding to a minimum value point in a fitting result as the target coefficient set.

7. The method according to claim 5, wherein the initial coefficient sets are randomly selected by using an e-greedy algorithm.

8. The method according to claim 1, wherein the target fault root cause comprises IP offline, application offline, a security device layer exception, a routing device layer exception, a network port error, or application overload.

9. The method according to claim 1, further comprising:
maintaining the first network based on the target fault root cause.

10. A fault root cause identification apparatus, comprising:
at least one processor;
one or more memories coupled to the at least one processor and storing instructions for execution by the at least one processor, the instructions instruct the at least one processor to cause the apparatus to:
determine, from a plurality of first success flows based on a first failure flow in a first network, a first target success flow related to the first failure flow, wherein there is a similarity between the first target success flow and the first failure flow met a first preset condition; and
determine a target fault root cause of the first failure flow based on feature indicators of the first failure flow, feature indicators of the first target success flow, and a trained first machine learning model;
determine a plurality of second failure flows in a second network and a first known fault root cause corresponding to each of the second failure flows;
determine, from a plurality of second success flows in the second network, a second target success flow related to each of the second failure flows, wherein there is a similarity between each of the second failure flows and the second target success flow related to the second failure flow if a second preset condition is met; and
obtain the first machine learning model by performing training based on feature indicators of the plurality of second failure flows, the first known fault root cause corresponding to each of the second failure flows, and feature indicators of the second target success flow related to each of the second failure flows.

11. The apparatus according to claim 10, wherein the first failure flow, the first target success flow, the plurality of first success flows, the plurality of second failure flows, the second target success flow related to each of the second failure flows, and the plurality of second success flows are all transmission control protocol (TCP) flows, internet protocol (IP) flows, or user datagram protocol (UDP) flows.

12. The apparatus according to claim 10, wherein the similarity between the first target success flow and the first failure flow met a first preset condition further comprises:
the similarity between the first target success flow and the first failure flow is greater than a preset similarity threshold; or the similarity between the first target success flow and the first failure flow belongs to first N maximum similarities between the plurality of first success flows and the first failure flow in the first network, wherein N is a preset value.

13. The apparatus according to claim 10, wherein the instructions further instruct the at least one processor to cause the apparatus to:
obtain the feature indicators of the first failure flow in the first network and feature indicators of the plurality of first success flows in the first network;
calculate a similarity between each of the first success flows and the first failure flow based on a target coefficient set, the feature indicators of the first failure flow, and the feature indicators of each of the first success flows, wherein each target coefficient comprised in the target coefficient set corresponds to one feature indicator of the first failure flow and one feature indicator of each of the first success flows; and
mark a first success flow corresponding to a highest similarity among a plurality of similarities obtained through calculation as the first target success flow.

14. The apparatus according to claim 13, wherein the instructions further instruct the at least one processor to cause the apparatus to:
obtain feature indicators of a third failure flow in a third network and feature indicators of a plurality of third success flows in the third network;
calculate a similarity between each of the third success flows and the third failure flow in each of the initial coefficient sets based on a plurality of randomly selected initial coefficient sets, the feature indicators of the third failure flow, and feature indicators of each of the third success flows;
determine, based on the plurality of similarities obtained through calculation, a third target success flow corresponding to the third failure flow in each of the initial coefficient sets;
determine, based on the feature indicators of the third failure flow, feature indicators of the third target success flow that corresponds to the plurality of initial coefficient sets, and a second machine learning model, a difference between a second learned fault root cause corresponding to the third failure flow and a second known fault root cause corresponding to the third failure flow in each of the initial coefficient sets; and determine the target coefficient set based on the plurality of initial coefficient sets and the difference that corresponds to each of the initial coefficient sets.

15. The apparatus according to claim 14, wherein the instructions further instruct the at least one processor to cause the apparatus to:
perform fitting on the plurality of initial coefficient sets and the difference that corresponds to each of the initial coefficient sets; and
determine a coefficient set corresponding to a minimum value point in a fitting result as the target coefficient set.

16. The apparatus according to claim 14, wherein the initial coefficient sets are randomly selected by using an e-greedy algorithm.

17. The apparatus according to claim 10, wherein the target fault root cause comprises IP offline, application offline, a security device layer exception, a routing device layer exception, a network port error, or application overload.

18. The apparatus according to claim 10, wherein the instructions further instruct the at least one processor to cause the apparatus to:
maintain the first network based on the target fault root cause.

* * * * *